US006810976B2

(12) United States Patent
Rohrs

(10) Patent No.: US 6,810,976 B2
(45) Date of Patent: Nov. 2, 2004

(54) OMNI-DIRECTIONAL, HOLONOMIC DRIVE MECHANISM

(75) Inventor: Jonathan D. Rohrs, South Deefield, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 93 days.

(21) Appl. No.: 10/128,123

(22) Filed: Apr. 23, 2002

(65) Prior Publication Data

US 2003/0196840 A1 Oct. 23, 2003

(51) Int. Cl.$^7$ .............................................. B62D 61/10
(52) U.S. Cl. ...................................................... 180/22
(58) Field of Search .............................. 180/22, 21, 23, 180/234, 236, 24.08, 211, 212, 15, 12, 65.1, 65.5, 65.6, 252, 253, 24.06, 24.07, 16; 301/5.3, 6.5

(56) References Cited

U.S. PATENT DOCUMENTS

| 1,305,535 | A | | 6/1919 | Grabowiecki | |
|---|---|---|---|---|---|
| 2,451,353 | A | | 10/1948 | Newell | |
| 3,789,947 | A | | 2/1974 | Blumrich | |
| 3,876,255 | A | | 4/1975 | Ilon | |
| 4,223,753 | A | | 9/1980 | Bradbury | |
| 4,573,548 | A | | 3/1986 | Holland | |
| 4,598,782 | A | | 7/1986 | Ilon | |
| 4,683,973 | A | * | 8/1987 | Honjo et al. ................. | 180/252 |
| 4,778,024 | A | * | 10/1988 | Matsumoto et al. ......... | 180/167 |
| 5,374,879 | A | | 12/1994 | Pin et al. | |
| 5,924,512 | A | | 7/1999 | Wada | |
| 6,340,065 | B1 | | 1/2002 | Harris | |
| 6,414,457 | B1 | * | 7/2002 | Agrawal et al. ........ | 318/568.12 |
| 6,491,127 | B1 | * | 12/2002 | Holmberg et al. ........... | 180/252 |

OTHER PUBLICATIONS

Patrick F. Muir and Charles P. Neuman, "Kinematic Modeling of Wheeled Mobile Robots," Journal of Robotic Systems, vol. 4, No. 2, 1987, pp. 281–340.

J. C. Alexander and J.H. Maddocks, "On the Kinematics of Wheeled Mobile Robots," International Journal of Robotics Research, vol. 8, No. 5, Oct. 1989, pp. 15–27.

S. Jonsson, "New AGV with Revolutionary Movement," 3rd International Conference on Automated Guided Vehicle Systems, Oct. 1985, pp. 135–144.

Kyung–Seok Byun, Sung–Jae Kim, and Jae–Bok Song, "Design of Continuous Alternate Wheels for Omnidirectional Mobile Robots," Proceedings of the 2001 IEEE International Conference on Robotics and Automation, May 2001, pp. 767–772.

Hans P. Moravec, "The Stanford Cart and the CMU Rover," Proceedings of the IEEE, vol. 71, No. 7, Jul. 1983, pp. 872–884.

Masayoshi Wada and Shunji Mori, "Holonomic and Omni-directional Vehicle with Conventional Tires," Proceedings of the 1996 IEEE International Conference on Robotics and Automation, Apr. 1996, pp. 3671–3676.

Masayoshi Wada, Akira Takagi, and Shunji Mori, "Caster Drive Mechanisms for Holonomic and Omnidirectional Mobile Platforms with no Over Constraint," Proceedings of the 2000 IEEE International Conference on Robotics and Automation, Apr. 2000, pp. 1531–1538.

(List continued on next page.)

*Primary Examiner*—Faye M. Fleming
(74) *Attorney, Agent, or Firm*—Sampson & Associates

(57) ABSTRACT

A drive mechanism is provided for omnidirectional and holonomic motion control of a vehicle. The drive mechanism may be used in a wide variety of applications where omnidirectional vehicles are advantageous, such as forklifts, aircraft maintenance platforms, robotic systems, wheelchairs, and recreational vehicles. The drive mechanism includes at least one wheel assembly rotatably coupled to a vehicle chassis, the wheel assembly including at least two wheels coupled to a wheel assembly chassis. The drive mechanism further includes a wheel constraint module configured to control the orientation of the wheels and a power module configured to rotate the wheel assembly. Vehicle motion may be controlled by actuation of the wheel constraint and power modules.

40 Claims, 9 Drawing Sheets

OTHER PUBLICATIONS

M. West and H. Asada, "Design of Ball Wheel Mechanisms for Omnidirectional Vehicles With Full Mobility and Invariant Kinematics," Journal of Mechanical Design, vol. 119, Jun. 1997, pp. 153–161.

Francois G. Pin and Stephen M. Kollough, "A New Family of Omnidirectional and Holonomic Wheeled Platforms for Mobile Robots," IEEE Transactions on Robotics and Automation, vol. 10, No. 4, Aug. 1994, pp. 480–489.

Mark West and Haruhiko Asada, "Design of a Holonomic Omnidirectional Vehicle," Proceedings of the 1992 IEEE International Conference on Robotics and Automation, May 1992, pp. 97–103.

Riichiro Damoto, Wendy Cheng, and Shigeo Hirose, "Holonomic Omni–Directional Vehicle with New Omni–Wheel Mechanism," Proceedings of the 2001 IEEE International Conference on Robotics and Automation, May 2001, pp. 773–778.

Jonathan D. Rohrs, "An Omnidirectional, Holonomic Drive Mechanism", BSME Thesis, MIT, 2001.

* cited by examiner

OMNI-DIRECTIONAL, HOLONOMIC DRIVE MECHANISM

BACKGROUND OF THE INVENTION (1) Field of the Invention

The present invention relates generally to omnidirectional vehicles and more particularly relates to a drive mechanism for an omnidirectional vehicle.

(2) Background Information

Omnidirectional vehicles capable of controlled motion in any planar direction have long been recognized as advantageous for many potential applications, such as those in commercial, medical, industrial, and recreational settings. Many, if not most, omnidirectional vehicles are similar in that they utilize wheels featuring rollers positioned about the periphery thereof. The rollers permit the wheels to support motion in directions at a nonzero angle to the wheel's plane of rotation (e.g., orthogonal thereto). Omnidirectional vehicles using the above-described wheels may typically move in any direction by rotating the wheels and rollers in combination. For example, as described by Ilon (in U.S. Pat. Nos. 4,598,782 and 3,876,255) each wheel's rotation is mechanically driven and servo controlled in a coordinated fashion to cause the vehicle to follow a desired path. Over the years numerous improvements to Ilon's wheel have been disclosed. For example, Harris (in U.S. Pat. No. 6,340,065) recently disclosed a potentially improved wheel assembly including a hub on which free spinning rollers are rotatably mounted at an angle to the wheel axis. The Harris wheel assembly is purported to provide for a relatively constant ride height and low vibration operation by configuring the rollers with an exterior profile, thickness, material properties and surface grooving to achieve constant deflection of the roller contact surface at all wheel rotation angles. Nevertheless, despite the improvements thereto, the above approaches tend to be disadvantageous in that they require relatively complex wheels.

One approach to constructing a highly maneuverable vehicle is to provide the vehicle with two independent conventional drive wheels and one or more casters. While this approach may allow for a zero turning radius, it does not provide for truly omnidirectional motion. An alternate approach to an omnidirectional vehicle is to couple conventional wheels to a steering link, which is coupled to the vehicle chassis and rotatable about a vertical axis. While this approach tends to allow for omnidirectional motion, it tends not to be holonomic in that it may not always be possible to change direction in a continuous manner, e.g., a discontinuous change in translational direction may require the vehicle to stop while the wheels are steered.

Therefore, there exists a need for an improved vehicle and/or drive mechanism that typically utilizes conventional wheels and that provides for omnidirectional, holonomic motion.

SUMMARY OF THE INVENTION

One aspect of the present invention includes a drive mechanism. The drive mechanism includes at least one tracking device assembly rotatably coupled about a tracking device assembly axis to a chassis, the tracking device assembly including a plurality of tracking devices coupled to a tracking device assembly chassis. The drive mechanism further includes a tracking device constraint module coupled to the tracking devices, the tracking device constraint module being configured to control orientation of the tracking devices, and the tracking device assembly configured for being rotatably driven about the tracking device assembly axis.

Another aspect of the present invention includes a drive mechanism. The drive mechanism includes at least one wheel assembly rotatably coupled about a wheel assembly axis to a vehicle chassis, the wheel assembly including a plurality of wheels coupled to a wheel assembly chassis. The drive mechanism further includes a wheel constraint module coupled to the wheels, the wheel constraint module being configured to control orientation of the wheels, and the wheel assembly configured for being rotatably driven about the wheel assembly axis.

In still another aspect, this invention includes a vehicle. The vehicle includes at least one wheel assembly rotatably coupled about a wheel assembly axis to a vehicle chassis, the wheel assembly including at least two wheels coupled to a wheel assembly chassis. The vehicle further includes a wheel constraint module coupled to the wheels, the wheel constraint module being configured to control orientation of the wheels and a power module coupled to the wheel assembly, the power module configured to rotate the wheel assembly about the wheel assembly axis.

In yet another aspect, this invention includes a method of propelling a vehicle. The method includes using a vehicle including at least one wheel assembly rotatably coupled about a wheel assembly axis to a vehicle chassis, the wheel assembly including at least two wheels coupled to a wheel assembly chassis, a wheel constraint module coupled to the wheels, the wheel constraint module being configured to control orientation of the wheels. The method further includes rotating the wheel assembly about the wheel assembly axis, and actuating the constraint module to effect a change in orientation of at least one of the wheels.

In a further aspect, this invention includes a method of fabricating a vehicle. The method includes forming at least one wheel assembly including at least two wheels coupled to a wheel assembly chassis and rotatably coupling the wheel assembly to a vehicle chassis. The method further includes coupling a power module to the wheel assembly, the power module configured to rotate the wheel assembly about the wheel assembly axis, and coupling a wheel constraint module to the wheels, the wheel constraint module being configured to control orientation of the wheels.

BRIEF DESCRIPTION OF THE DRAWINGS

FIG. 4b is a bottom view, with portions removed for clarity, of the embodiment of FIG. 4a;

DETAILED DESCRIPTION

Figure 1:
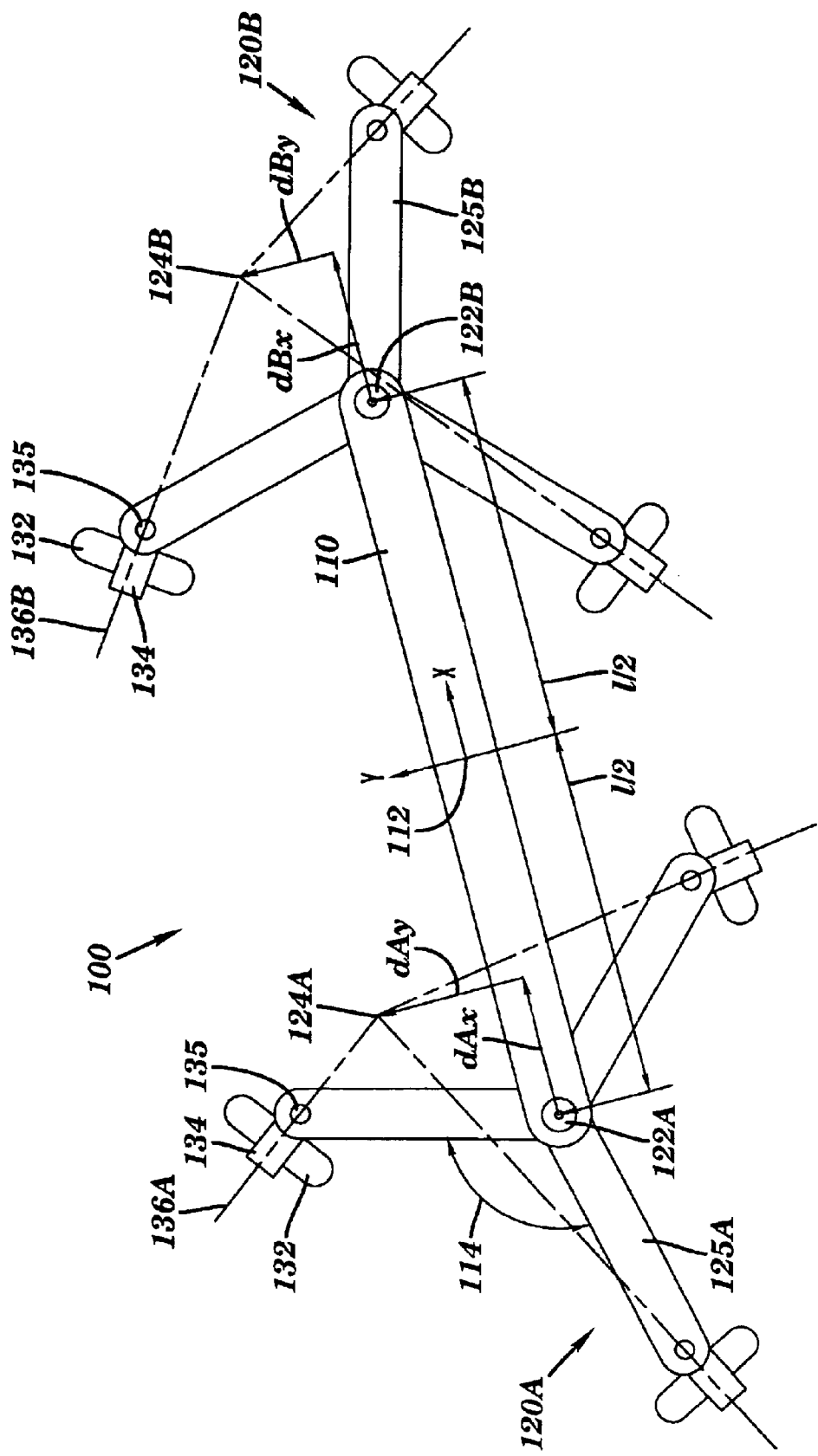
FIG. 1 is a schematic representation of one embodiment of the present invention.

Referring briefly to the accompanying figures, the present invention is directed to an omnidirectional, holonomic drive mechanism and/or vehicle. This invention may be well suited for many applications in which omnidirectional vehicles are potentially useful and/or advantageous. The ability to move in any direction or rotate within the perimeter of the vehicle is typically advantageous for any industrial or commercial vehicle that must be maneuvered within confined warehouse spaces, including forklifts, scissorlifts, aircraft support and maintenance platforms, motorized dollies, and delivery trucks. Omnidirectional capability is also typically desirable to wheelchair operators, enabling them to maneuver with relative freedom in confined spaces such as elevators. Additional exemplary applications to which this invention may be well suited include wide ranging industrial and military applications including industrial material handling vehicles, robotic systems, aircraft maintenance vehicles, recreational vehicles, and the like.

As used herein the term "omnidirectional" refers to the ability to move in substantially any planar direction, i.e., side-to-side (lateral), forward/back, and rotational. These directions are generally referred to herein as x, y, and $\theta_z$, respectively. The term "holonomic" is used in a manner substantially consistent with the literature use of the term and refers to the ability to move in a planar direction with three planar degrees of freedom, i.e., two translations and one rotation. Hence, as used herein, a holonomic vehicle has the ability to move in a planar direction at a velocity made up of substantially any proportion of the three planar velocities (forward/back, lateral, and rotational), as well as the ability to change these proportions in a substantially continuous manner.

In general, the present invention includes a drive mechanism including at least one tracking device assembly rotatably coupled to a vehicle chassis. The drive mechanism further includes a power module for rotating the tracking device assembly. The tracking device assembly includes at least two tracking devices rotatably coupled to a tracking device assembly chassis. This embodiment further includes at least one tracking device constraint module configured to selectively control the orientation of the tracking devices so that transverse axes of the devices in each tracking device assembly intercept at a predetermined point. The velocity (i.e., speed and direction of motion) of the vehicle may be controlled by adjusting the position of the intercept point relative to the axis of rotation of the tracking device assembly chassis and by adjusting the velocity of rotation of the tracking device assembly.

As will become apparent in light of the present disclosure, substantially any tracking device capable of translation (e.g., by rolling or sliding) in a longitudinal direction, while resisting translation transversely thereto, may be utilized. For example, tracking devices such as skates or submerged fins may be well suited for use in particular embodiments of this invention. In generally desirable embodiments of this invention the tracking devices are wheels. Hence, for convenience, the tracking device assembly, tracking device assembly chassis, and tracking device constraint module are referred to hereinbelow as the wheel assembly, wheel assembly chassis, and wheel constraint module, respectively. It should be understood, however, that such discussion similarly applies to embodiments having other types of tracking devices, such as slidable devices (e.g., ice skates), or submersible fins, as described in further detail hereinbelow. Also, as used herein, the term 'wheel' or 'wheels' refers to substantially any device that operates by rolling, including, for example, rollers, sprockets, gears, cogs, and treads of the type commonly used on bulldozers and other earth-moving equipment.

The present invention advantageously provides for an omnidirectional, holonomic vehicle, which includes distinct and separate power and directional control components. As such, a single motor running at a constant speed may be used to power the vehicle. Further, the vehicle may utilize relatively inexpensive power sources such as conventional internal combustion or conventional electric motors, which are not typically usable by prior art holonomic drive systems. Further still, the forces on the control components are typically relatively small, which tends to reduce costs and minimize component wear and/or failure.

This invention may advantageously utilize conventional wheels, which are typically less expensive, more robust (e.g., better able to tolerate debris and/or other nonuniformities in the drive surface), and able to bear relatively higher loads, than the relatively complex wheel/roller assemblies used in prior omnidirectional vehicles. Embodiments of this invention may be still further advantageous in that each of the wheels may be effectively passive, (i.e., not driven). Thus the vehicle does not necessarily require power transmission through complex joints (e.g., universal joints) and/or other mechanisms. Moreover, embodiments of this invention advantageously do not steer stationary wheels, which is generally more difficult and produces more wheel wear than steering moving wheels.

Embodiments of this invention also provide for an omnidirectional, holonomic vehicle having relatively low manufacturing tolerances, which tends to reduce the costs associated with manufacturing thereof. This aspect is discussed in more detail hereinbelow with respect to particular embodiments of the invention. These and other advantages of this invention will become evident in light of the following discussion of various embodiments thereof.

Referring now to FIG. 1, one embodiment of a vehicle 100 of the present invention is illustrated. Vehicle 100 includes two (or more) wheel assemblies 120A and 120B coupled to a vehicle chassis 110. As described hereinabove, vehicle 100 may be substantially any vehicle in which an omnidirectional drive mechanism may be advantageous. Vehicle chassis 110 may be substantially any component that functions to hold the wheel assemblies 120A and 120B in place relative to one another (i.e. at a fixed distance $\hbar$). For example, vehicle chassis 110 may be a portion of the frame of a wheelchair, a forklift, a robot, and the like.

Wheel assemblies 120A and 120B include wheel assembly chassis 125A and 125B, respectively, which are coupled to vehicle chassis 110 at rotational axes 122A and 122B (also referred to herein as wheel assembly axes), respectively. Wheel assembly chassis 125A and 125B are configured to be rotatably driven about wheel assembly axes 122A and 122B, respectively, and may therefore include bearings or other components known to those of ordinary skill in the art (not shown). Chassis 125A and 125B further include at least two (and preferably three or more) wheel housings (also referred to as holders) 134 coupled thereto. Each wheel housing 134 is rotatably coupled about an axis of rotation 135 (also referred to herein a wheel housing axes) that extends through a distinct, fixed point 135 on the wheel assembly chassis 125A and 125B. Axes 122A, 122B and 135 are substantially orthogonal to the x and y-axes (i.e., parallel to the z-axis which is not shown). The wheel housings 134 may be positioned in substantially any pattern about wheel assembly chassis 125A and 125B. In a generally desirably embodiment, as shown in FIG. 1, wheel assemblies 120A and 120B each include three wheel housings 134 positioned substantially symmetrically thereabout (i.e., to notionally form a substantially equilateral triangle in which angle 114 is about 120 degrees).

Wheel housings 134 each include a wheel 132 coupled thereto. In the embodiment shown, the wheel axes 136A, 136B intersect the axis of rotation 135 of the housing 134 to which the wheel is coupled. In the embodiment shown, wheels 132 are not driven (i.e., are not directly coupled to a motor, transmission, or other device that forcibly rotates the wheel to effect movement of vehicle 100). Rather, the wheels may rotate substantially freely about their axes of rotation 136A, 136B. In general, substantially any type of conventional, relatively rigid wheel is suitable.

Figure 2:
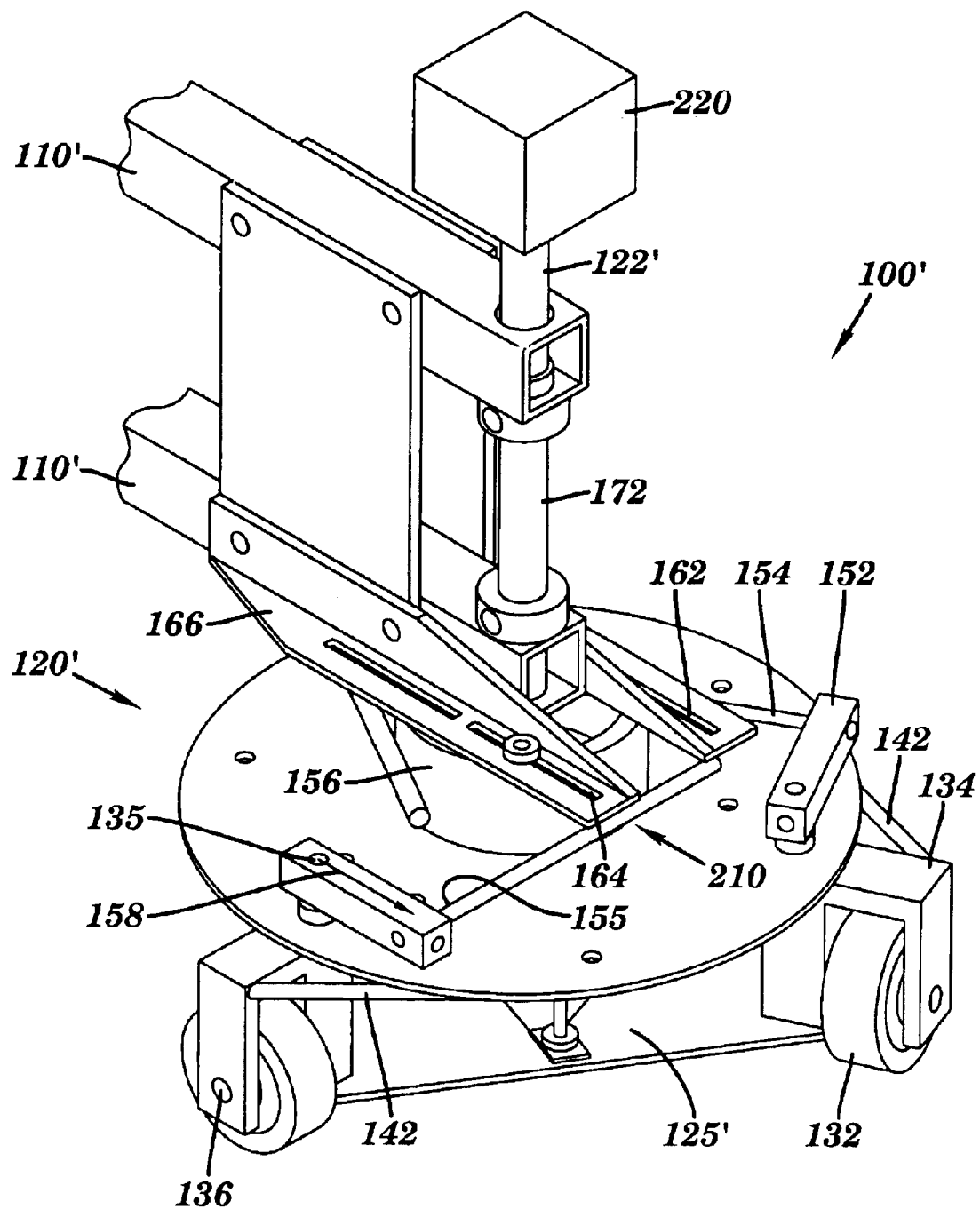
FIG. 2 is a perspective, partially schematic view of a portion of a second embodiment of the present invention.
Figure 3A:
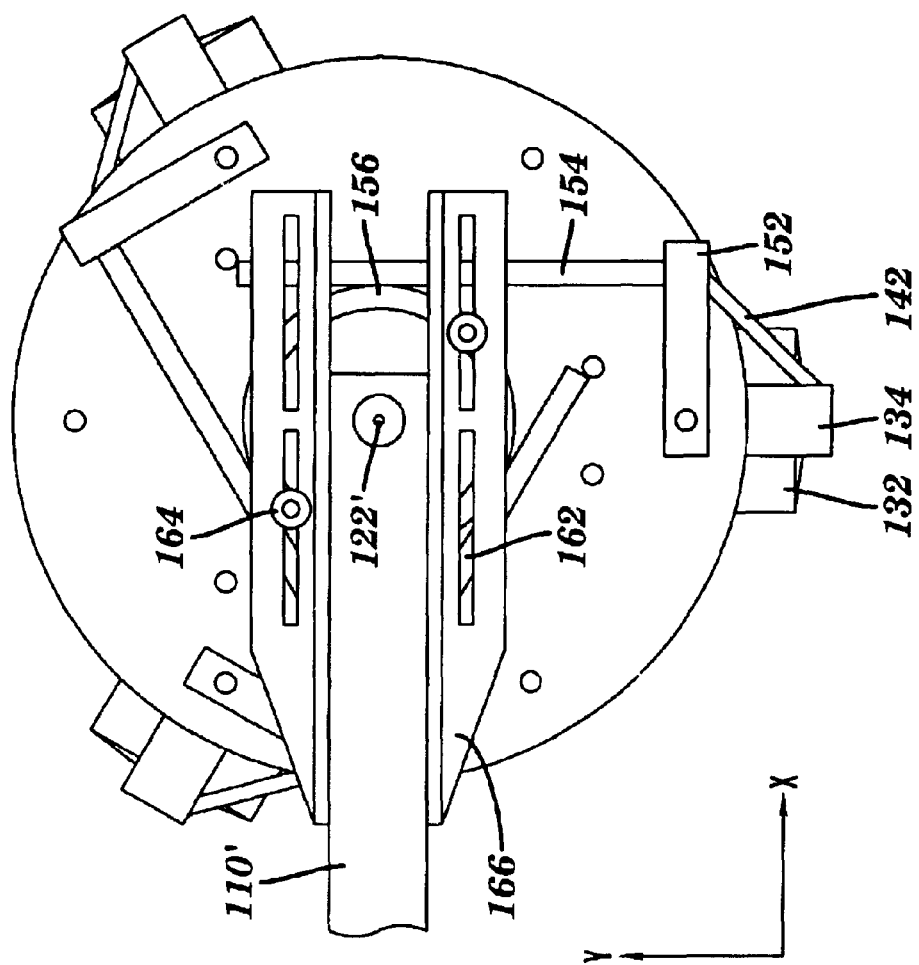
FIG. 3a is a top view of the embodiment of FIG. 2.
Figure 3B:
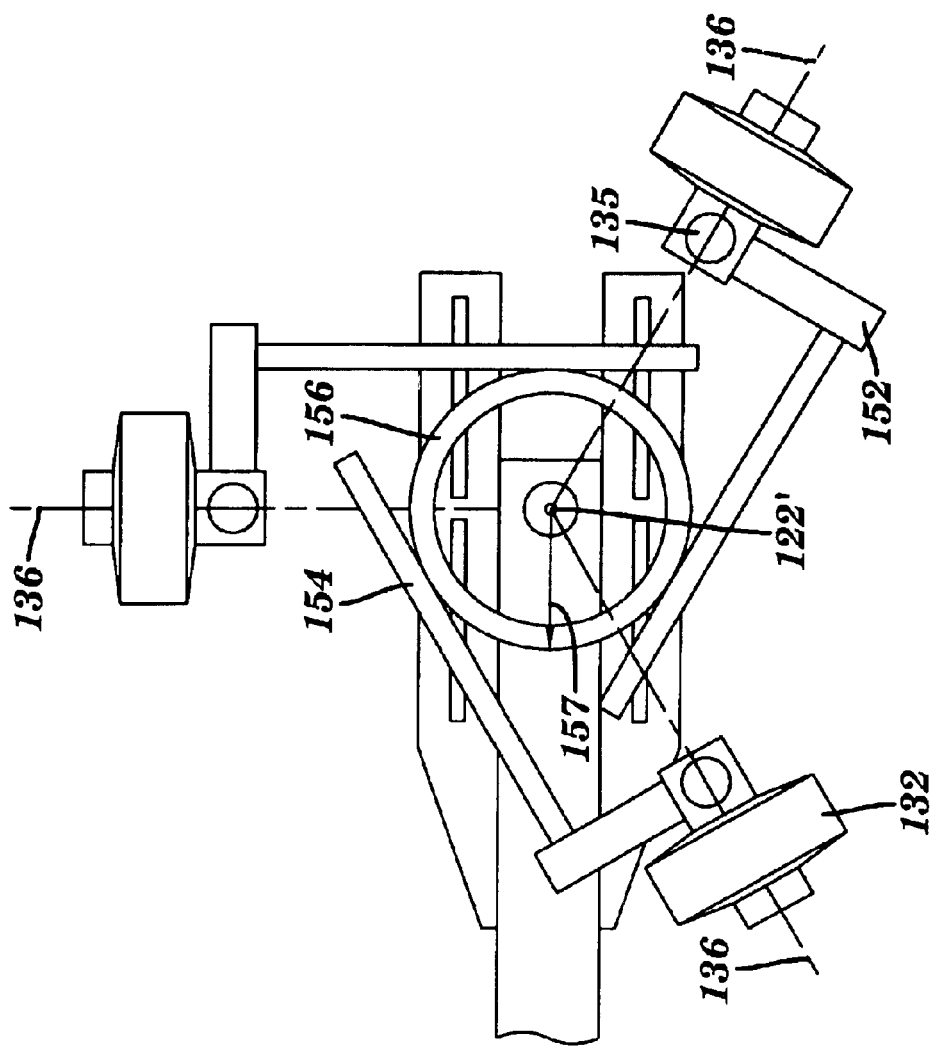
FIG. 3b is a bottom view, with portions removed for clarity, of the embodiment of FIG. 2.
Figure 4A:
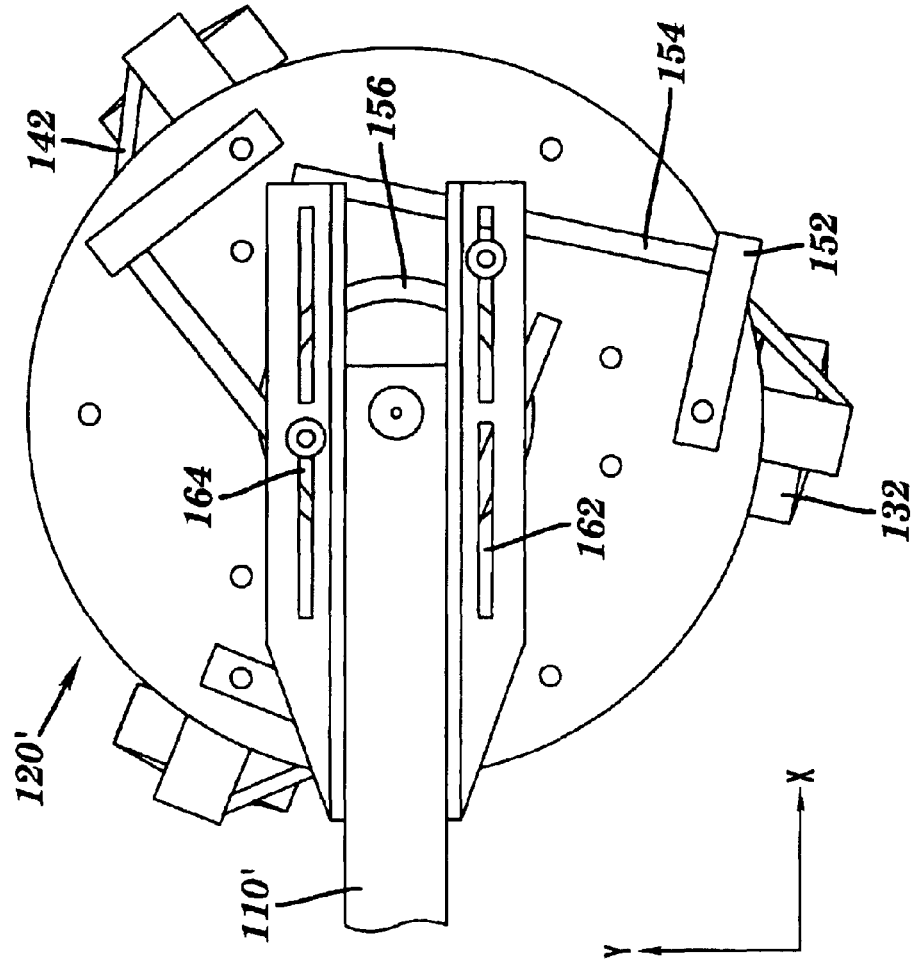
FIG. 4a is a top view of the embodiment of FIG. 2 after movement of a constraint ring in the x direction.
Figure 4B:
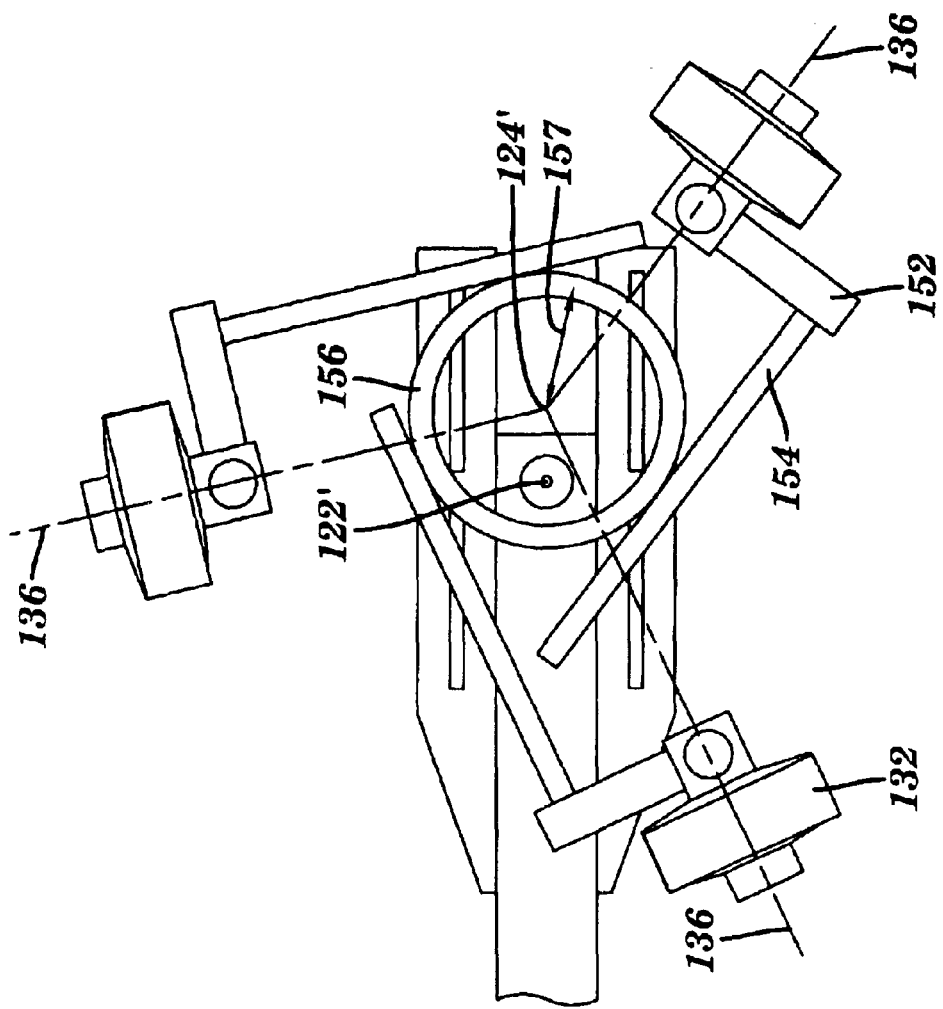

Vehicle 100 typically further includes a wheel constraint module 210 (see e.g., FIG. 2) for controlling the orientation (i.e., pivoting or steering) of the wheels. The wheel constraint module constrains the rotation of wheel housings 134 about housing axes 135 so that each of the wheel axes 136A, 136B of a particular wheel assembly 120A, 120B, intersect at a distinct, movable point 124A, 124B (also referred to herein as a wheel axes intercept point). A wheel constraint module of substantially any type may be utilized provided that it does not interfere with the rotation of wheel assemblies 120A and 120B about axes 122A and 122B, respectively. Generally desirable wheel constraint modules are typically capable of adjusting the positions of intercept points 124A and 124B in substantially any planar direction (i.e., in the plane of the wheel axes 136A and 136B). However, a wheel constraint module capable only of adjusting the position of points 124A and 124B along a line (e.g., along either the x or y-axes) may also be suitable for some embodiments of this invention. Exemplary wheel constraint modules are discussed in more detail hereinbelow with respect to particular embodiments of the invention.

Vehicle 100 also typically includes one or more power modules 220 (FIG. 2) for rotatably driving wheel assemblies 120A and 120B about wheel assembly axes 122A and 122B, respectively. The power module(s) may be of substantially any type that is capable of rotatably driving the wheel assemblies 120A, 120B. For example, the power module may include a single conventional internal combustion or electric motor that drives both wheel assemblies 120A and 120B via a conventional roller chain or belt assembly. Alternately, each wheel assembly 120A, 120B may be driven by a mutually distinct motor. The power module(s) may be configured to rotate the wheel assemblies 120A and 120B in substantially any manner. For example, the wheel assemblies 120A and 120B may be rotated at a constant or variable speed in either a clockwise or counter clockwise direction. Further, the two or more wheel assemblies 120A and 120B may be rotated at about the same speed or at mutually distinct speeds. Rotation of the wheel assemblies 120A and 120B, and the effect thereof on vehicle motion, is discussed in further detail hereinbelow.

The artisan of ordinary skill will readily recognize that the choice of a particular power module and/or a particular constraining module is not of critical importance to the general structure and/or function of the present invention, but is merely related to the optimization thereof for a specific application.

As described hereinabove, the vehicle of this invention (e.g., vehicle 100) is advantageous in that the wheels are not necessarily driven. Vehicle movement is provided by rotating the wheel assemblies 120A and 120B about wheel assembly axes 122A and 122B, respectively, and by moving one or more of the intercept points 124A and 124B relative to the wheel assembly axes 122A and 122B, respectively. As described in more detail hereinbelow with respect to embodiments 100' and 100" (FIGS. 2–6), such movement of intercept points 124A and 124B is typically accomplished by moving constraining modules 210 (see e.g., FIG. 2), which causes at least two of the wheels 132 to be controllably pivoted (i.e., steered) about their respective housing axes 135.

Movement of the vehicle 100 is effected by rotating the wheel assemblies 120A and 120B, in combination with appropriately selecting the position of intercept points 124A and 124B relative to wheel assembly axes 122A and 122B. The direction and speed of movement is determined by both the position of intercept points 124A, 124B, and by the rotational velocity of the wheel assemblies 120A and 120B. A kinematic analysis of vehicle 100 demonstrates that the velocity may be described by the following equations (the kinematic analysis is detailed in "An Omnidirectional, Holonomic Drive Mechanism", by J. D. Rohrs, BSME Thesis, MIT, 2001, which is fully incorporated by reference herein):

$$\Omega = \frac{-(\omega_B d_{Bx} - \omega_A d_{Ax})}{\hbar + d_{Bx} - d_{Ax}} \quad (1)$$

$$v_x = \frac{(\omega_B + \Omega)d_{By} + (\omega_A + \Omega)d_{Ay}}{2} \quad (2)$$

$$v_y = \frac{(\omega_B + \Omega)d_{Bx} + (\omega_A + \Omega)d_{Ax}}{-2} \quad (3)$$

provided that $$(\omega_B + \Omega)d_{By} = (\omega_A + \Omega)d_{Ay} \quad (4)$$

and $$\hbar + d_{Bx} - d_{Ax} \neq 0 \quad (5)$$

where $\Omega$ is the rotational velocity of the vehicle about a center point 112, $v_x$ and $v_y$ are the velocities of the vehicle in the x and y directions, respectively, $d_{Ax}$, $d_{Ay}$, $d_{Bx}$, and $d_{Ay}$, are shown in FIG. 1 and describe the position of intercept points 124A and 124B relative to wheel assembly axes 122A and 122B, respectively, $\omega_A$ and $\omega_B$ are the rotational velocities of wheel assemblies 120A and 120B, respectively, about axes 122A and 122B, respectively, relative to the vehicle chassis 110, and $\hbar$ is the distance between axes 122A and 122B.

As shown in Equations 1–5, vehicle 100 may be driven at substantially any planar velocity (i.e. in any planar direction at substantially any speed) simply by controlling one or more of the rotational velocities of wheel assemblies 120A and 120B and/or the respective positions of intercept points 124A and 124B relative to wheel assembly axes 122A and 122B. Further, inspection of equations 1–5, indicates that when the rotational velocities, $\omega_A$ and $\omega_B$, of wheel assemblies 120A and 120B are constant, the velocity of vehicle 100 may be controlled simply by controlling the positions of intercept points 124A and 124B. This feature is potentially of great advantage, since it provides for a substantially omnidirectional, holonomic vehicle equipped with only a single power module (e.g., an electric motor) configured to drive the wheel assemblies 120A and 120B (e.g., using a roller chain), and thus potentially eliminates many of the design constraints and costs associated with the more complex drive components (e.g., servo and/or stepper motors) of the prior art.

This invention is further advantageous in that the equations (Eq. 1–5) governing vehicle motion are relatively simple, especially when the rotational velocities of wheel assemblies 120A and 120B are equal and much greater than the rotational velocity of the vehicle (i.e., when $|\omega_A=\omega_B|>>|\Omega|$). As such, the effects of moving intercept points 124A and 124B relative to wheel assembly axes 122A and 122B, respectively, are somewhat intuitive to those of ordinary skill in the mathematical and mechanical arts. For example, movement of intercept points 124A and 124B an equal distance in opposite directions along the x-axis results in pure rotational motion of vehicle 100. Alternatively, movement of intercept points 124A and 124B an equal distance in the same direction along the x-axis results in pure translational motion in the y direction (e.g., forward and back). When the wheel assemblies are rotating in the positive direction, movement of the intercept points 124A and 124B in the positive x direction results in vehicle movement in the negative y direction, while movement of the intercept points 124A and 124B in the negative x direction results in vehicle movement in the positive y direction. Further, movement of intercept points 124A and 124B an equal distance in the same direction along the y-axis results in pure translational motion in the x direction (e.g., lateral or side-to-side). Movement of the intercept points 124A and 124B in the positive y direction results in vehicle movement in the positive x direction, while movement of the intercept points 124A and 124B in the negative y direction results in vehicle movement in the negative x direction. Further still, given a uniform rotational velocity of wheel assemblies 120A, 120B, the speed at which the vehicle moves is essentially linearly proportional to the distance between the intercept points 124A and 124B and the wheel assembly axes 122A and 122B, respectively. Additionally, the direction of motion of vehicle 100 may be reversed simply by reversing the direction of rotation of wheel assemblies 120A and 120B. The artisan of ordinary skill will readily recognize that vehicle velocities other than the exemplary instances described above (including combinations thereof) are readily achievable as described in Equations 1–5.

As mentioned hereinabove, this invention advantageously does not require relatively high manufacturing tolerances. For example, examination of Equations 1–5 reveals that the velocities of the vehicle are substantially independent of the angle 114 (FIG. 1) between the wheels 132 on the wheel assemblies 120A and 120B, the distance from the wheel housing axes 135 to wheel assembly axes 122A, 122B, and the radius of the wheel. Other dimensions, such as the distance, $h$, between wheel assembles 120A and 120B, have a relatively small effect on the velocities.

Referring now to FIGS. 2–4b, a portion of an alternate embodiment of a vehicle 100' of this invention, illustrating one embodiment of a wheel constraint module, is shown. Vehicle 100' was constructed as a prototype for performing 'proof-of-principle' type experiments. As such, the components making up the wheel constraint module 210 are configured for manual adjustment and provide for only two degrees of freedom of vehicle motion (rather than three). A wheel constraint module 210 providing for fall three degrees of freedom of motion is described in more detail hereinbelow.

Vehicle 100' includes at least two wheel assemblies (only one of which is shown and described) rotatably coupled to a vehicle chassis 110' (at wheel assembly shaft 172 along wheel assembly axis 122'). Wheel assemblies 120' include a plurality of wheel housings 134, including wheels 132, rotatably coupled to wheel assembly chassis 125'. Wheel housings 134 are rigidly coupled to offset links 152, which are rotatable about wheel housing axes 135 and are further rigidly coupled to follower arms 154. Offset links 152 are sized and shaped so that the distance 158 from the inner face 155 of follower arm 154 is substantially equal to the outer radius 157 (FIGS. 3b and 4b) of a constraint ring 156. The follower arms 154 are biased against the constraint ring 156 (e.g., by spring 142). Further, in this embodiment, wheel axes 136 intercept housing axes 135 and are substantially parallel to follower arms 154. Wheel axes 136 are thereby constrained to form intercept 124' (FIG. 4b) at the center of constraint ring 156. Thus, movement of constraint ring 156 in (i.e., parallel to) the plane of wheel axes 136 results in planar movement of intercept point 124' relative to wheel assembly axis 122'. Movement of constraint ring 156 may be accomplished by substantially any suitable mechanism known to those skilled in the mechanical arts. For example, as shown, constraint ring 156 may be fitted with one or more guide pins 164 which are manually movable in slots 162 in a constraint ring bracket 166. In this embodiment 100', movement of the constraint ring 156 along the x-axis, while rotating wheel assembly 120' about axis 122', was demonstrated to translate vehicle 100' along the y-axis.

Figure 5:
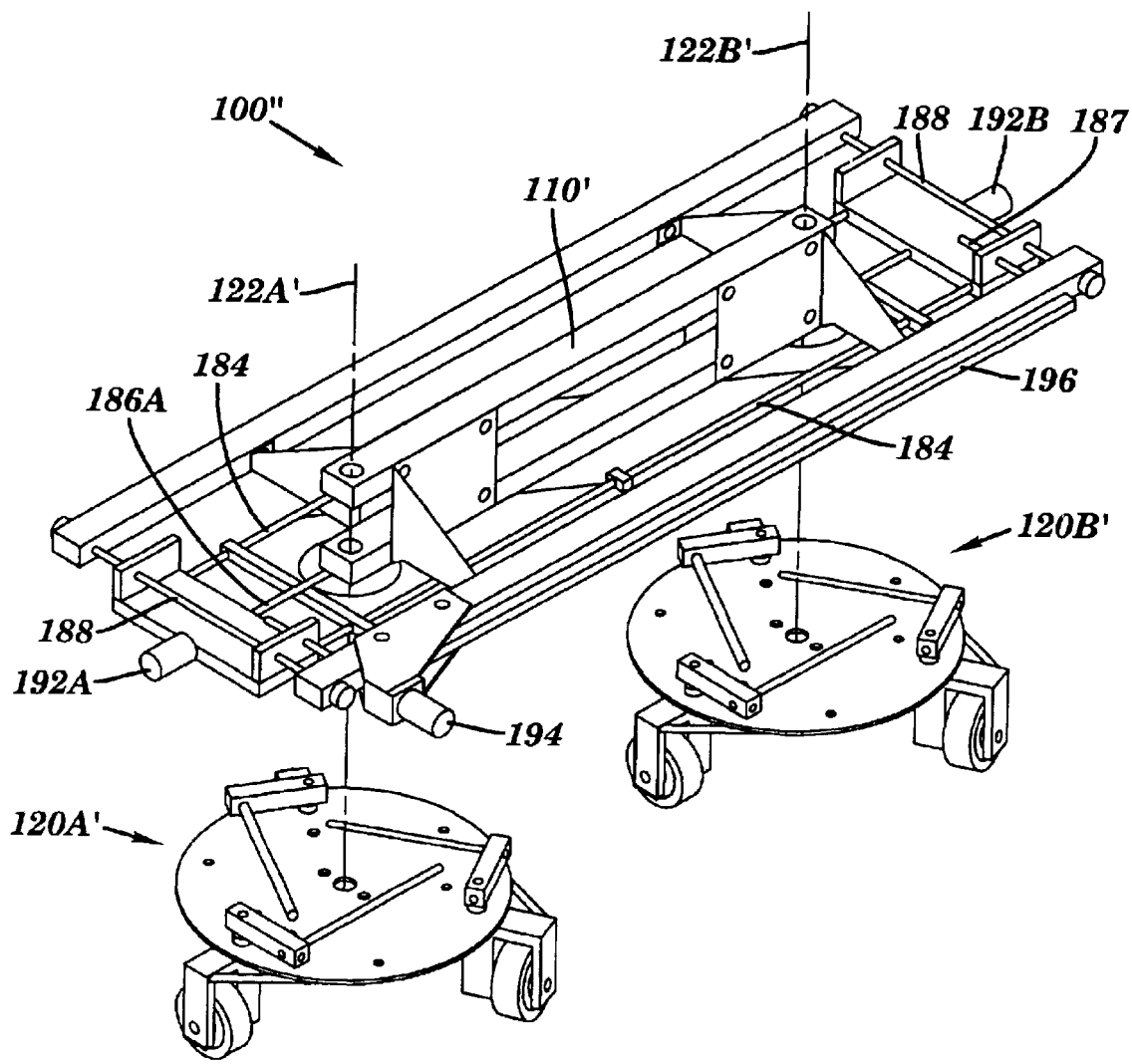
FIG. 5 is a partially exploded, perspective view of a third embodiment of the present invention.
Figure 6:
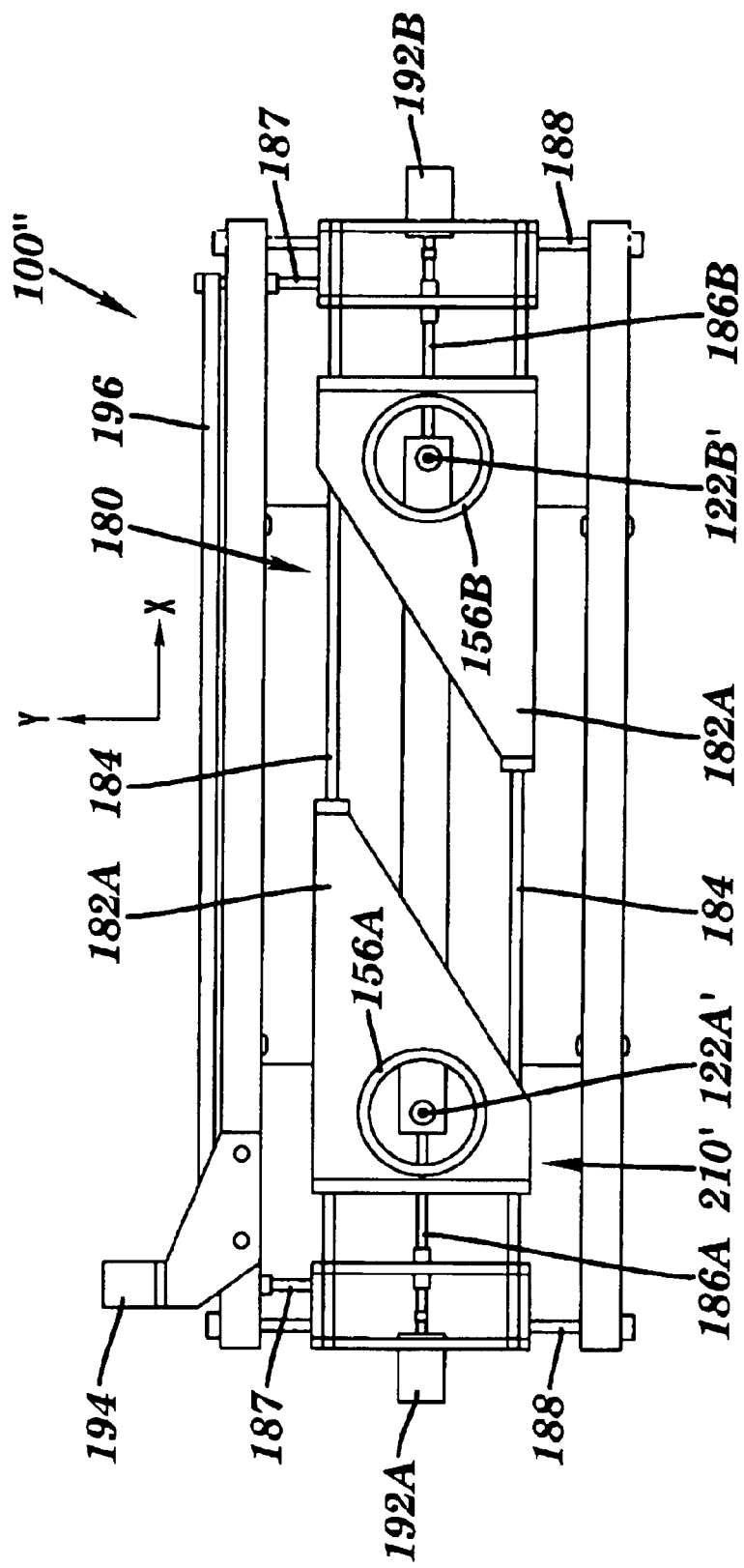
FIG. 6 is a bottom view, with portions removed for clarity, of the embodiment of FIG. 5.

Referring now to FIGS. 5–6, a vehicle 100" incorporating an alternate wheel constraint module 210' (FIG. 6), which includes a mechanism for moving constraint ring 156 in a manner capable of moving vehicle 100" in a full three degrees of freedom. Vehicle 100" is configured so that the wheel assemblies 120A' and 120B' rotate with equal angular velocities (i.e., at the same speed and in the same direction). Thus, according to Equation 4, $d_{Ay}$ must equal $d_{By}$. The artisan of ordinary skill will readily recognize that vehicle 100" is merely exemplary of one embodiment providing for three degrees of freedom of movement. Modifications to vehicle 100" enabling the wheel assemblies to rotate with unequal angular velocities (at different speeds and/or in different directions) are well within the scope of this invention.

As shown, constraint rings 156A and 156B are mounted in ring housings (also referred to as holders) 182A and 182B respectively, each of which are slidably mounted to longitudinal guides 184. The ring housings 182A and 182B (and thus the constraint rings 156A, 156B) are constrained to move in the x direction along the longitudinal bars 184. The position of the ring housings 182A and 182B in the x direction may be adjusted by a linear actuator of substantially any form known to the skilled artisan, such as, for example, lead screws 186A and 186B, respectively, which may be actuated manually or may be coupled to motors 192A and 192B, respectively. Motors 192A and 192B are typically electric motors, such as stepper motors or servomotors. Motors 192A and 192B, lead screws 186A, 186B, and longitudinal guides 184 may be coupled together within a frame assembly 180, which is slidably mounted to transverse guides 188. The frame assembly 180 is thus constrained to move in the y direction along transverse guides 188. The position of the ring housings 182A and 182B in the y direction may be adjusted by linear actuators, which may take substantially any form know to the skilled artisan, such as lead screws 187, which may be actuated manually or coupled to motor 194. Though not required, motor 194 may further be coupled to a timing belt 196 which is coupled to lead screws 187 (e.g., by pulleys mounted to thereto) and ensures that the lead screws 187 move in unison and that the motion of each of the ring housings 182A and 182B in the y direction is substantially equal.

Figure 7:
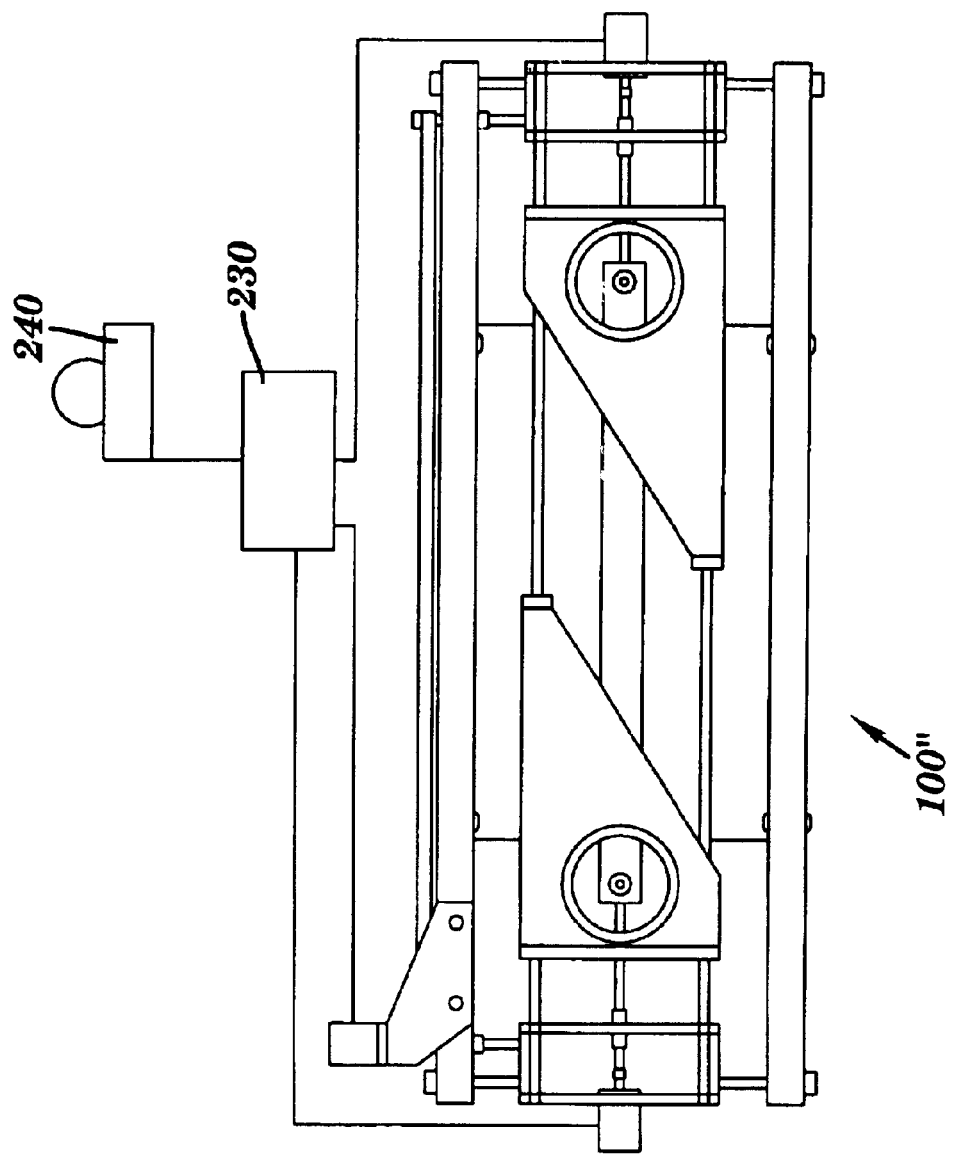
FIG. 7 is a partially schematic bottom view, with portions removed for clarity, of an embodiment similar to that of FIG. 5.

Moreover, as shown in FIG. 7, the skilled artisan will recognize that a controller 230, such as a microprocessor, coupled to a joystick, voice-activated sensor, remote control (e.g., using RF (radio frequency), IR (infra-red), or other wireless communications technologies), or other control device 240, such as commonly used in the field of adaptive vehicle control technology (i.e., for handicapped motor vehicle and wheel chair operators), may be employed to facilitate movement of the various wheel constraint modules shown and described herein, without departing from the spirit and scope of the present invention.

Vehicles 100, 100', and 100" may optionally include one or more additional wheels, such as caster-type wheels. The inclusion of at least one caster wheel may be advantageous so that the center of gravity of the vehicle need not be located directly above the wheel assemblies, which may be of practical importance for some applications, such as forklifts. Additionally, a constant velocity joint (e.g., a universal joint) may be utilized in coupling the wheel assemblies 120, 120' 120A', 120B' to the vehicle chassis, which may be advantageous for applications in which the drive surface is somewhat uneven. For example, in vehicle 100", one of the wheel assemblies 120A', 120B' may be coupled to an axle (e.g., shaft 172 in FIG. 2) via a constant velocity joint to permit one wheel assembly to pivot relative to the other. While the embodiments described hereinabove include passive wheels 132 (i.e., not driven), embodiments of the present invention may alternately include a mechanism for driving the wheels 132. In such embodiments, rotation of the wheel assemblies is typically induced by traction with the ground instead of action from the chassis. This approach may be advantageous in driving vehicles with a single wheel assembly. In such cases, the vehicle chassis may even be rigidly connected to the wheel assembly if the particular application can tolerate the vehicle chassis rotating at the same rate as the wheel assembly.

An artisan skilled in the mechanical arts will also recognize that the drive mechanism of this invention may be used to move another object relative to the vehicle chassis. For example, the vehicle chassis may be fixed to a stationary object, and rotation of the wheel assemblies utilized to induce relative movement of some other object in contact with the wheels.

Alternatively, forced motion of a vehicle of the present invention relative to another object by some external means may be used to rotate the wheel assemblies (tracking device assemblies). For example, a hydraulic turbine could be formed by mounting the vehicle chassis in a stationary manner over a river (e.g., which flows in the x-direction). In this embodiment, the tracking devices may take the form of submerged fins. Location of the intercept point in the y-direction would then induce rotation of the tracking device assemblies, with the velocity of rotation being substantially proportional to the distance that the intercept point is offset from the tracking device assembly axis.

EXAMPLE 1

An experimental vehicle similar to vehicle 100' (FIGS. 2–4b) was fabricated according to the principles of the present invention in order to evaluate the performance thereof. Thirteen tests were conducted with mutually distinct $d_{Ax}$, $d_{Bx}$ pairs in order to compare and contrast the performance of the experimental vehicle to the theoretical performance described in Equations 1–5. The experimental vehicle included two wheel assemblies separated by a distance, $\hbar$, of about 38 cm (15 inches). For each test, the wheel assemblies were rotated at a substantially constant angular velocity of about 5.5 radians/sec (315 degrees/second, 52 rpm) using an electric motor coupled to each wheel assembly via a roller chain. As shown in Table 1, relatively good agreement was achieved between the measured and theoretical velocities over a relatively wide range of values of $d_{Ax}$ and $d_{Bx}$.

TABLE 1

| | $d_{Ax}$ (mm) | $d_{Bx}$ (mm) | Measured | | | Theory | | |
|---|---|---|---|---|---|---|---|---|
| | | | $v_y$ (cm/sec) | $v_x$ (cm/sec) | $\Omega$ (deg/sec) | $v_y$ (cm/sec) | $v_y$ (cm/sec) | $\Omega$ (deg/sec) |
| 1 | 18.8 | −19.0 | 0.2 | −0.9 | 34 | 0.1 | 0 | 35 |
| 2 | 18.8 | 0.3 | −5.7 | −0.2 | 16 | −5.5 | 0 | 16 |
| 3 | 18.8 | 19.7 | −11 | 0.6 | −1 | −10.6 | 0 | −1 |
| 4 | 9.3 | −9.7 | 0.3 | −0.8 | 16 | 0.2 | 0 | 17 |
| 5 | 9.3 | 9.7 | −5.5 | 0.9 | −0.4 | −5.2 | 0 | −0.5 |
| 6 | 0.7 | −18.8 | 4.8 | −0.1 | 15 | 5.2 | 0 | 17 |
| 7 | 0.7 | −0.3 | −0.4 | 0.4 | −1 | −0.2 | 0 | 1 |
| 8 | 0.7 | 19.7 | −5.9 | −0.3 | −16 | −5.4 | 0 | −15 |
| 9 | −9.7 | −9.7 | 4.9 | 0.3 | −3 | 5.3 | 0 | 0 |
| 10 | −9.7 | 9.7 | −0.8 | 0.5 | −15 | 0 | 0 | −15 |
| 11 | −19.7 | −18.8 | 10.1 | −0.4 | −2 | 10.6 | 0 | −1 |
| 12 | −19.7 | −0.3 | 4.5 | 0.1 | −16 | 5.2 | 0 | −15 |
| 13 | −19.7 | 19.2 | −0.9 | 0.3 | −30 | 0.1 | 0 | −29 |

The foregoing Example and description are intended primarily for the purposes of illustration. Although the invention has been described according to an exemplary embodiment, it should be understood by those of ordinary skill in the art that modifications may be made without departing from the spirit of the invention. The scope of the invention is not to be considered limited by the description of the invention set forth in the specification or example, but rather as defined by the following claims.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

What is claimed is:

1. A drive mechanism:
   at least one tracking device assembly rotatably coupled about a tracking device assembly axis to a chassis;
   said tracking device assembly including a plurality of tracking devices coupled to a tracking device assembly chassis;

each of said plurality of tracking devices configured for mutually distinct orientation;

a tracking device constraint module coupled to said tracking devices, said tracking device constraint module being configured to control orientation of said tracking devices; and said tracking device assembly configured for being rotationally driven about the tracking device assembly axis.

2. The drive mechanism of claim 1 wherein:

said tracking device assembly is a wheel assembly;

said tracking device assembly axis is a wheel assembly axis;

said plurality of tracking devices is a plurality of wheels, each of said plurality of wheels including a wheel axis;

said tracking device assembly chassis is a wheel assembly chassis;

said tracking device constraint module is a wheel constraint module; and said chassis is a vehicle chassis.

3. The drive mechanism of claim 2 being a substantially omnidirectional drive mechanism.

4. The drive mechanism of claim 2 being a substantially holonomic drive mechanism.

5. The drive mechanism of claim 2 comprising two wheel assemblies rotatably coupled about mutually distinct wheel assembly axes to said vehicle chassis.

6. The drive mechanism of claim 2 wherein said wheel assembly includes three wheels.

7. The drive mechanism of claim 6 wherein said three wheels are disposed in a substantially equilateral triangular pattern about said wheel assembly.

8. The drive mechanism of claim 2 comprising a plurality of wheel assemblies rotatably coupled about mutually distinct wheel assembly axes to said vehicle chassis and wherein each of said wheel assemblies includes three wheels.

9. The drive mechanism of claim 2 wherein each of said wheels are rotatably mounted to a wheel housing, said wheel housing being rotatably mounted to said wheel assembly chassis.

10. The drive mechanism of claim 2 wherein said wheel assembly comprises an intercept point, the wheel axes of said wheels being constrained by said wheel constraint module to intercept at said intercept point.

11. The drive mechanism of claim 10 wherein the position of said intercept point relative to said wheel assembly axis is adjustable.

12. The drive mechanism of claim 11 wherein said position of said intercept point relative to said wheel assembly axis is adjustable in two dimensions, said two dimensions defining a plane substantially perpendicular to said wheel assembly axis.

13. The drive mechanism of claim 10 wherein a change of the position of said intercept point relative to said wheel assembly axis effects a change in drive velocity of said drive mechanism.

14. The drive mechanism of claim 2 wherein said wheel constraint module comprises a constraint ring coupled to said wheels, said constraint ring including a central axis.

15. The drive mechanism of claim 14 wherein the wheel axes of said wheels intercept at said central axis of said constraint ring.

16. The drive mechanism of claim 14 wherein the position of said constraint ring relative to said wheel assembly axis is adjustable in two dimensions, said two dimensions defining a plane substantially perpendicular to said central axis.

17. The drive mechanism of claim 14 wherein movement of said constraint ring effects a change in the orientation of at least one of said wheels.

18. The drive mechanism of claim 14 wherein each of said wheels is coupled to said constraint ring by a follower arm extending in a direction substantially parallel to said wheel axis but offset therefrom by a distance substantially equal to an outer radius of said constraint ring.

19. The drive mechanism of claim 18 wherein said follower arm is offset from said wheel axis and coupled to said wheel by an offset link.

20. The drive mechanism of claim 18 wherein said follower arm is biased against said constraint ring.

21. The drive mechanism of claim 14 wherein:

said constraint ring is mounted in a housing;

the position of said housing relative to said wheel assembly axis being adjustable in two dimensions, said two dimensions defining a plane substantially perpendicular to said central axis.

22. The drive mechanism of claim 21 wherein:

said housing is slidably mounted on one or more longitudinal guides;

an actuator coupled to said housing; and actuation of said actuator adjusts the position of said housing along said longitudinal guide.

23. The drive mechanism of claim 22 wherein:

said housing, said one or more longitudinal guides, and said actuator comprise a frame assembly;

said frame assembly is slidably mounted on one or more transverse guides, said transverse guide being disposed in a substantially perpendicular orientation to said longitudinal guide;

said frame assembly is coupled to an other actuator; and actuation of said other actuator adjusts the position of said frame assembly along said transverse guide.

24. The drive mechanism of claim 2 wherein rotation of said wheel assembly about said wheel assembly axis propels said vehicle.

25. The drive mechanism of claim 2 further comprising a power module coupled to said wheel assembly, said power module configured to rotate said wheel assembly about said wheel assembly axis.

26. The drive mechanism of claim 25 wherein said power module comprises an electric motor.

27. The drive mechanism of claim 25 wherein said power module comprises an internal combustion motor.

28. The drive mechanism of claim 2 further comprising a power module coupled to at least one of said plurality of wheels, said power module configured to rotate said wheel about its wheel axis.

29. The drive mechanism of claim 2 further including a controller coupled to said wheel constraint module.

30. The drive mechanism of claim 29 further including a control device coupled to said controller.

31. The drive mechanism of claim 1 wherein said plurality of tracking devices comprises a plurality of fins.

32. The drive mechanism of claim 1 wherein said plurality of tracking devices comprises a slidable device.

33. A vehicle comprising:

at least one wheel assembly rotatably coupled about a wheel assembly axis to a vehicle chassis;

said wheel assembly including at least two wheels coupled to a wheel assembly chassis, each of said wheels including a wheel axis;

said wheels configured for mutually distinct orientation;

a wheel constraint module coupled to said wheels, said wheel constraint module being configured to control orientation of said wheels; and a power module coupled to said wheel assembly, said power module configured to rotate said wheel assembly about said wheel assembly axis.

34. The vehicle of claim 33 wherein said vehicle is selected from the group consisting of forklifts, scissorlifts, aircraft support and maintenance platforms, motorized dollies, delivery trucks, industrial material handling vehicles, robotic systems, aircraft maintenance vehicles, wheelchairs, and recreational vehicles.

35. The vehicle of claim 33 wherein said vehicle chassis is a portion of a vehicle frame.

36. The vehicle of claim 33 wherein said vehicle is omnidirectional.

37. The vehicle of claim 33 wherein said vehicle is holonomic.

38. The vehicle of claim 33 comprising at least one additional wheel.

39. The vehicle of claim 38 wherein said at least one additional wheel comprises a caster wheel.

40. A method of propelling a vehicle comprising:

using a vehicle including:
- at least one wheel assembly rotatably coupled about a wheel assembly axis to a vehicle chassis;
- the wheel assembly including at least two wheels coupled to a wheel assembly chassis;
- said wheels configured for mutually distinct orientation; and
- a wheel constraint module coupled to the wheels, the wheel constraint module being configured to control orientation of the wheels;

rotating the wheel assembly about the wheel assembly axis; and actuating the constraint module to effect a change in orientation of at least one of the wheels.

* * * * *